United States Patent
Garrettson et al.

(10) Patent No.: US 9,466,847 B2
(45) Date of Patent: Oct. 11, 2016

(54) INTEGRATED RECIRCULATING FUEL CELL METHODS

(71) Applicant: ALTERGY SYSTEMS, Folsom, CA (US)

(72) Inventors: Glen A. Garrettson, Antelope, CA (US); David Grupp, Sacramento, CA (US); Jeremy Dabel, Sacramento, CA (US)

(73) Assignee: ALTERGY SYSTEMS, Folsom, CA (US)

( * ) Notice: Subject to any disclaimer, the term of this patent is extended or adjusted under 35 U.S.C. 154(b) by 0 days.

(21) Appl. No.: 14/692,576

(22) Filed: Apr. 21, 2015

(65) Prior Publication Data

US 2015/0295257 A1    Oct. 15, 2015

Related U.S. Application Data

(63) Continuation of application No. 13/196,837, filed on Aug. 2, 2011, now Pat. No. 9,029,034.

(60) Provisional application No. 61/444,595, filed on Feb. 18, 2011.

(51) Int. Cl.
  *H01M 8/04* (2016.01)
  *H01M 8/24* (2016.01)
  *H01M 8/10* (2016.01)

(52) U.S. Cl.
  CPC ..... *H01M 8/04201* (2013.01); *H01M 8/04014* (2013.01); *H01M 8/04089* (2013.01); *H01M 8/04097* (2013.01); *H01M 8/04223* (2013.01); *H01M 8/04238* (2013.01);
  (Continued)

(58) Field of Classification Search
  None
  See application file for complete search history.

(56) References Cited

U.S. PATENT DOCUMENTS 6,858,336 B2 * 2/2005 Reiser ............... H01M 8/04223
                                                429/415
9,029,034 B2   5/2015 Garrettson et al.
(Continued)

FOREIGN PATENT DOCUMENTS

CN        1717827 A    1/2006
CN      101304096 A   11/2008
(Continued)

OTHER PUBLICATIONS

International Search Report and Written Opinion issued on Apr. 10, 2012, including claims searched, related PCT International Application No. PCT/US2011/054710, pp. 1-14.
(Continued)

*Primary Examiner* — Daniel Gatewood
(74) *Attorney, Agent, or Firm* — O'Banion & Ritchey LLP; John P. O'Banion

(57) ABSTRACT

A PEM fuel system includes a fuel cell stack comprising one or more PEM fuel cells and fan configured to provide process air to supply oxidizer to and cool the fuel cell stack. The system has an air duct coupled to the fan and the fuel cell stack, and an electrical service load coupled to the fuel cell stack for receiving electrical power generated from reactions within the fuel cell stack. The system further includes as auxiliary electrical load coupled to the fuel cell stack and located within the air duct to reduce potentials across the fuel cell stack. The air duct is configured to direct the flow of air to the fuel cell stack and auxiliary electrical load to provide cooling air to the fuel cell stack and auxiliary electrical load.

8 Claims, 10 Drawing Sheets

(52) U.S. Cl.
CPC .......... *H01M 8/1018* (2013.01); *H01M 8/24* (2013.01); *H01M 8/2465* (2013.01); *H01M 8/2475* (2013.01); *H01M 2008/1095* (2013.01); *Y02E 60/50* (2013.01)

(56) References Cited

U.S. PATENT DOCUMENTS

| | | | |
|---|---|---|---|
| 2003/0129462 A1* | 7/2003 | Yang ................. | H01M 8/04097 429/415 |
| 2003/0134164 A1 | 7/2003 | Reiser et al. | |
| 2004/0072046 A1 | 4/2004 | Schmidt | |
| 2007/0154752 A1 | 7/2007 | McElroy et al. | |
| 2007/0231628 A1* | 10/2007 | Lyle ................. | H01M 8/04089 429/429 |
| 2007/0231670 A1 | 10/2007 | Katahira et al. | |
| 2009/0098427 A1 | 4/2009 | Reiser | |

FOREIGN PATENT DOCUMENTS

| | | | |
|---|---|---|---|
| CN | 101317290 A | | 12/2008 |
| CN | 101694946 A | | 4/2010 |
| JP | 6065054 B | | 8/1994 |
| JP | 2005-515603 | | 5/2005 |
| KR | 2007-0048486 | | 5/2007 |
| KR | 1020070048486 | * | 5/2007 |

OTHER PUBLICATIONS

Korean Intellectual Property Office (KIPO), Office Action issued on Jan. 12, 2015 for corresponding Korean Patent Application No. 10-2013-7021537, original Office Action (pp. 1-10), English translation of the Office Action (pp. 10-17) and Pending Claims (pp. 18-21) pp. 1-21.

State Intellectual Property Office of the People's Republic of China, Notice of the First Office Action, appln. No. 201180067811.8, issued Apr. 22, 2015, pp. 1-9, with English machine translation pp. 10-14, and claims examined pp. 15-19, corresponding to U.S. Appl. No. 14/692,576.

Taiwan Intellectual Property Office, Office Action, appln. No. 101103251, issued Sep. 7, 2015, pp. 1-12, with claims examined pp. 13-19, and English summary pp. 20-21, corresponding to U.S. Appl. No. 14/692,576.

Intellectual Property Corporation of Malaysia, Substantive Examination Adverse Report, appln. No. PI 2013701419, issued May 29, 2015, pp. 1-4, with claims examined pp. 5-9, corresponding to U.S. Appl. No. 14/692,576.

State Intellectual Property Office of the People's Republic of China, Notice of the Second Office Action including English language translation and claims examined, appln. No. 201180067811.8, issued Feb. 19, 2016, pp. 1-17, corresponding to U.S. Appl. No. 14/692,576. All prior art listed has been previously submitted in an IDS to the USPTO.

* cited by examiner

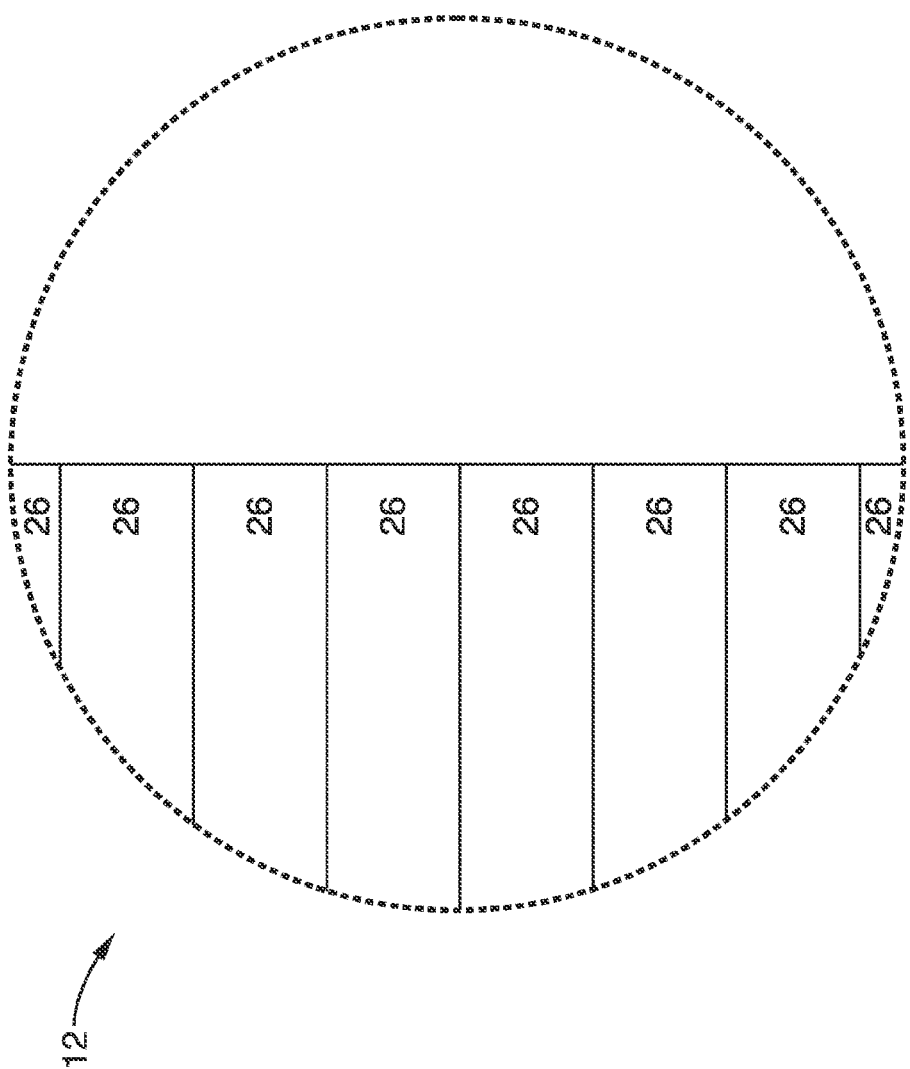

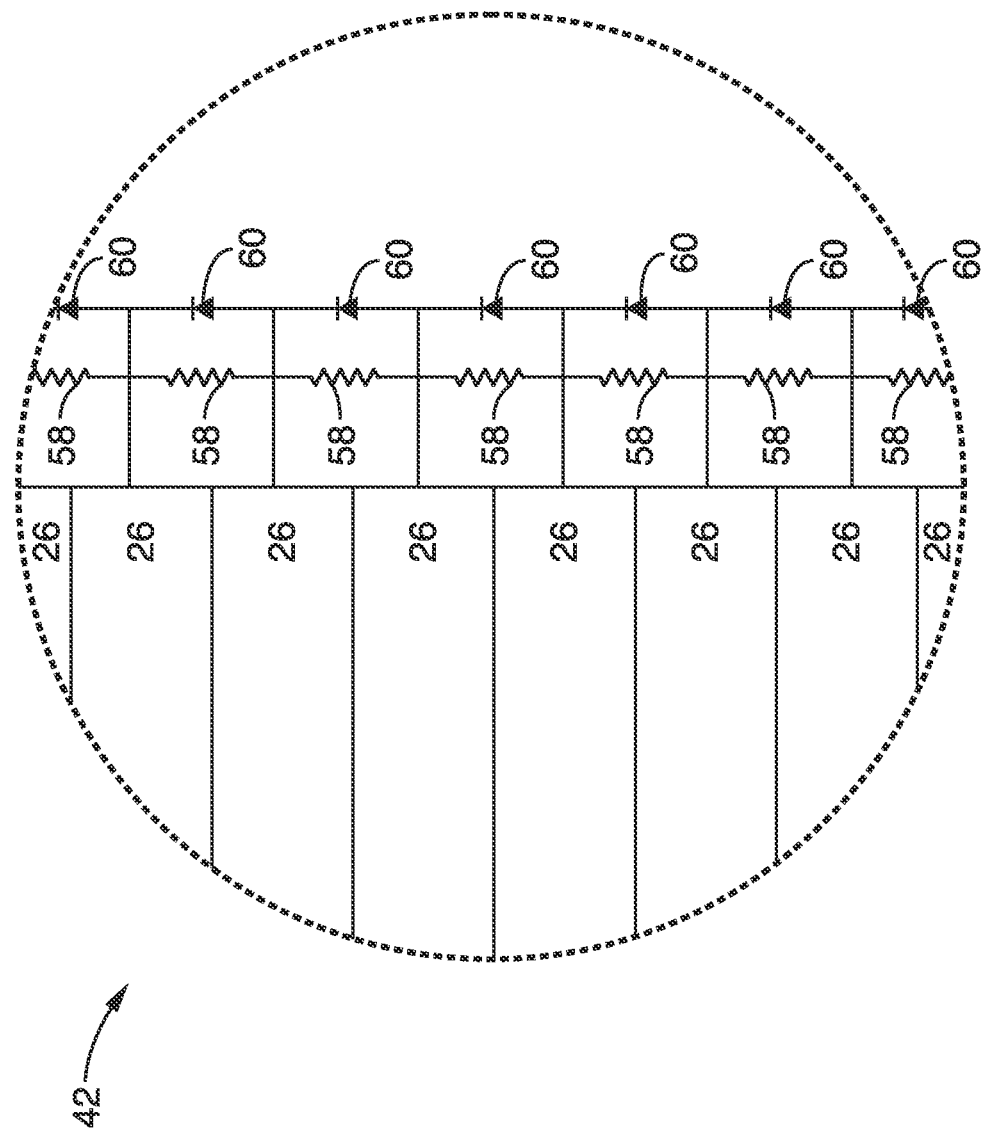

INTEGRATED RECIRCULATING FUEL CELL METHODS

CROSS-REFERENCE TO RELATED APPLICATIONS

This application is a continuation of U.S. patent application Ser. No. 13/196,837 filed on Aug. 2, 2011, incorporated herein by reference in its entirety, which claims the benefit of U.S. provisional patent application Ser. No. 61/444,595 filed on Feb. 18, 2011, incorporated herein by reference in its entirety.

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to a hydrogen fuel cell electrical power generating system, and more particularly to an open cathode proton exchange membrane (PEM) system.

2. Description of Related Art

FIG. 1A illustrates a prior art fuel cell system 10 having a fuel cell stack 12 comprised of a plurality of individual fuel cells 26 connected in series (shown in further detail in FIG. 1B). A stack fan 15 is used to provide process oxidizer (air) and also perform a cooling function by either drawing air 22 through cooling features of the stack 12 and delivering air to the cathode, or by blowing air through the fuel cell stack 12 for cooling and delivering air to the cathode. Additionally, there may be ducting 14 to assist in directing the air flow 22 associated with the fuel cell stack 12. In these systems, a fuel source 32 of hydrogen (or optionally reformate) is provided to stack 12. Inlet fuel pressure control can be provided by a pressure regulator 19. The fuel is fed into the fuel cell stack 12 through a fuel inlet valve 16 and exits the fuel cell stack 12 through fuel exit valve or purge valve 28.

The fuel can be delivered by the pass through method or the periodic purge method. In the pass through method, the fuel 32 is continuously bled through the fuel cell stack 12 by way of the fuel inlet valve 16 and the fuel exit valve 28 to prevent the accumulation of inert species such as nitrogen and water vapor in the anode chamber.

In the periodic purge method, the fuel exit valve 28 is held closed while fuel 32 is delivered to the fuel cell stack 12 thought the fuel inlet valve 16. Over time, inert species such as nitrogen and water vapor accumulate in the anode chamber and impede the electrochemical reaction due to the interference of the mass transport of hydrogen to the anode electrodes. This necessitates the periodic opening of the fuel exit valve 28 to purge the inert species from the anode chamber.

Electrical power is taken from the fuel cell stack 12 through electrical leads 18 and 30 and delivered through a switch 24 to an electrical service load 20. Shutting down the system may simply entail disconnecting the electrical service load 20 by opening the switch or relay 24, or discontinuing the supply of fuel to the fuel cell stack by closing the fuel supply valve 16 and opening the purge valve 28 to allow the pressure within the anode volume to equilibrate and then turning off the stack fan 15, stopping the flow of air 22.

This procedure leaves fuel within the anode volume, which allows the electrochemical reactions to continue within the fuel cell stack and creates a potential across the fuel cell stack, a potentially unsafe condition. Leaving the purge valve 28 open allows the anode volume to eventually fill with air, thus reducing the potential across the fuel cell stack 12 to zero, inerting the fuel cell stack 12 and eliminating the unsafe condition.

However, starting and stopping proton exchange membrane (PEM) fuel cell 12 is often detrimental to the platinum catalysts (not shown) used in PEM fuel cells, because high cathode potentials develop during the exchange of oxidizer (air) and hydrogen in the anode volume during the starting and stopping processes. These high cathode potentials cause the corrosion (oxidation) of the carbon catalyst support material on the cathode, leading to the degradation of catalyst itself and a resultant loss of performance.

In addition, when simply opening the purge valve and allowing air to be drawn into and through the fuel cell stack, the anode volume is placed in a mixed gas condition for an extended period of time, leading to very rapid cathode catalyst degradation.

Accordingly, an object of the present invention is a fuel cell system that reduces the residence time of the mixed gas condition at the anode, and reduces the potentials across the fuel cell during the starting and stopping of the fuel cell system, to thereby reduce the impact of mixed gas high cathode potentials. At least some of these objectives will be met in the description provided below.

BRIEF SUMMARY OF THE INVENTION

The present invention relates to a hydrogen fuel cell electrical power generating system having open cathode proton exchange membrane (PEM) system. The present invention simplifies operation and fabrication of the fuel cell system.

In some embodiments, accessories are added to control and regulate the fuel cell system such as control systems, safety systems, power conversation and management system and accessories to assist in the start up of the fuel cell stack from a non-operating condition to an operational state.

Also, to assist in the shut down from the operational state to a non-operating condition such as the addition of auxiliary electrical loads, the addition of air pumps or compressors are used for the inerting of the fuel cell stack during non-operational periods.

In addition, in some embodiments, modified air ducting is used to direct the path of the cooling and process air through the fuel cell stack, and, in some cases, re-circulate the air through the fuel cell stack in order to maintain a proper operating temperature.

Other embodiments include the use of individual resistors across each fuel cell in the fuel cell stack and/or the inclusion of diodes across each fuel cell in the fuel cell stack.

Further embodiments consolidate the aforementioned accessories in a simplification of the fuel cell power system for cost reduction and ease of operation.

A first aspect of the invention is a fuel cell system, comprising: a fuel cell stack and a fan configured to provide process air to supply oxidizer to said fuel cell stack; an air duct coupled to said fan and the fuel cell stack; an electrical service load coupled to the fuel cell stack, the electrical service load configured for receiving electrical power generated from reactions within the fuel cell stack; and an auxiliary electrical load coupled to the fuel cell stack; wherein the auxiliary is electrical load configured to reduce potentials across the fuel cell stack; and wherein the air duct is configured to direct the flow of air to the fuel cell stack to provide cooling air to the fuel cell stack In one embodiment, the system includes one or more air dampers configured to control the flow of air within the air ducting.

In another embodiment, the system includes a second fan configured to provide cooling air to the auxiliary electrical load.

In one embodiment, the flow of air is re-circulated to force the air heated by fuel cell stack operation to be reintroduced into the fuel cell stack, thereby providing heat for proper operation of the fuel cell stack.

In a further embodiment, the system includes resistor elements disposed between cells of the fuel cell stack, wherein the resistor elements are configured to equilibrate potentials across the individual fuel cells.

Another aspect is a method of operating a fuel cell system having a fuel cell stack, comprising the steps of: from an inert state, engaging an auxiliary electrical load coupled to the fuel cell stack; directing fuel though the fuel cell stack to purge inerting air from the stack; operating a fan to direct air flow across the fuel cell stack; said air flow providing cooling air and process oxidizer to said fuel cell stack; and applying an electrical load across the stack to receive electrical power generated from reactions within the fuel cell stack.

In one embodiment of the current aspect, the inerting air is purged from the fuel cell stack while simultaneously engaging the auxiliary electrical load to lower potentials within the fuel cell stack.

In another embodiment the method further includes directing cooling air across the auxiliary electrical load.

In another embodiment the method further includes directing purge air through the fuel cell stack upon stopping of the fuel cell system.

In a further embodiment the method further includes controlling one or more air dampers coupled to the fuel cell stack to direct the airflow to the fuel cell stack and auxiliary electrical load; and operating the one or more air dampers to redirect air heated by the fuel cell stack back into the fuel cell stack, thereby providing heat for operation of the fuel cell stack.

In yet a further embodiment the method further includes controlling the opening and closing of the one or more air dampers to allow or limit infusion of ambient air into the air duct.

Another aspect is a PEM fuel cell system, comprising: a fuel cell stack comprising one or more PEM fuel cells and fan configured to provide process air to supply oxidizer to the fuel cell stack; an air duct coupled to the fan and the fuel cell stack; an electrical service load coupled to the fuel cell stack, the electrical load configured for receiving electrical power generated from reactions within the fuel cell stack; and an auxiliary electrical load coupled to the fuel cell stack and located within the air duct; wherein the auxiliary electrical load is configured to reduce potentials across the fuel cell stack; wherein the air duct is configured to direct the flow of air to the fuel cell stack and auxiliary electrical load to provide cooling air to the fuel cell stack and auxiliary electrical load.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1B is a schematic depiction of a detail of the fuel cell stack of FIG. 1A showing the arrangement of individual fuel cells.

FIG. 2B is a schematic diagram of a detail of the fuel cell stack of FIG. 2A showing the arrangement of individual fuel cells parallel resister elements and diodes.

Figure 3A:
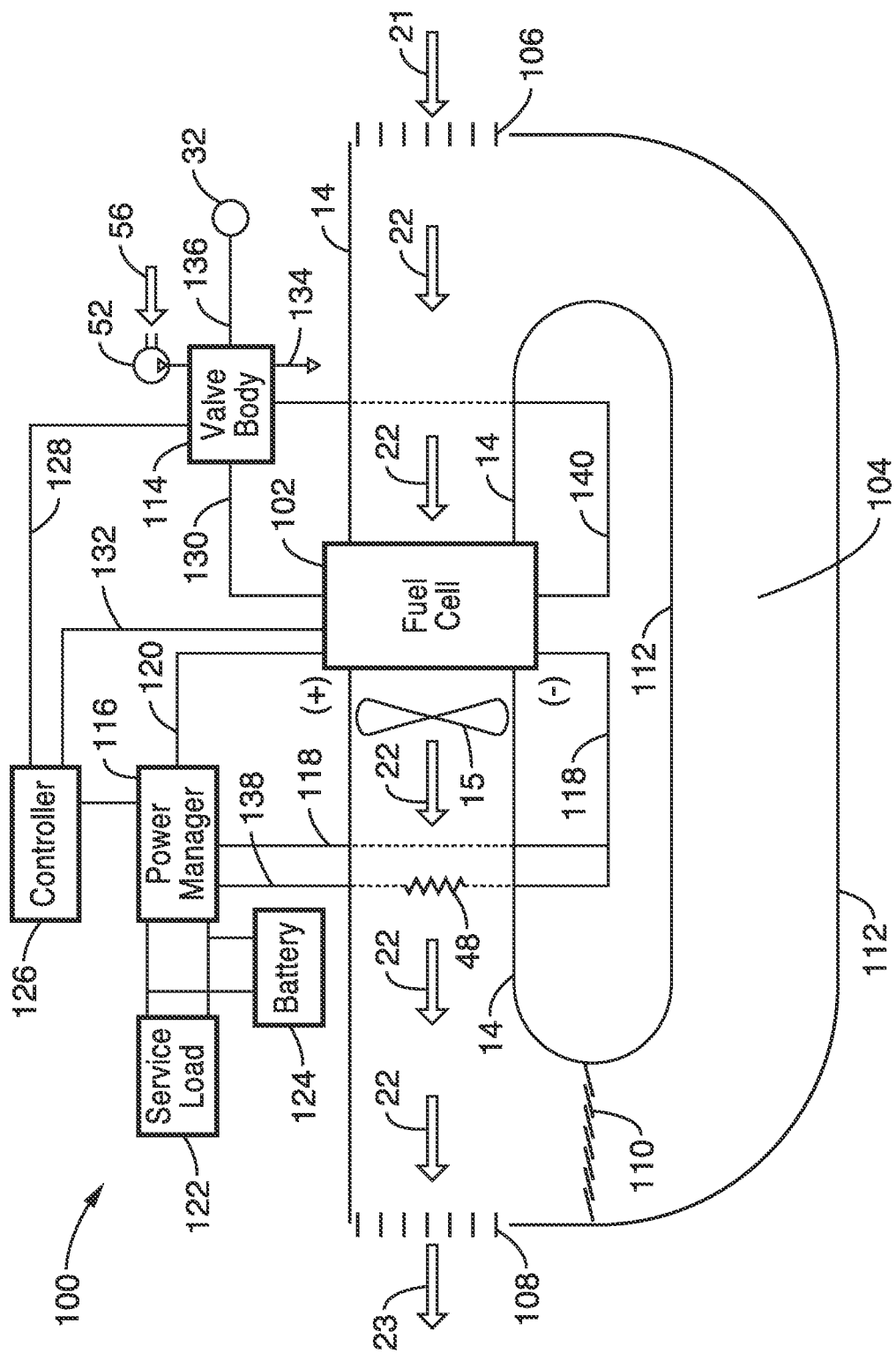
Figure 3B:
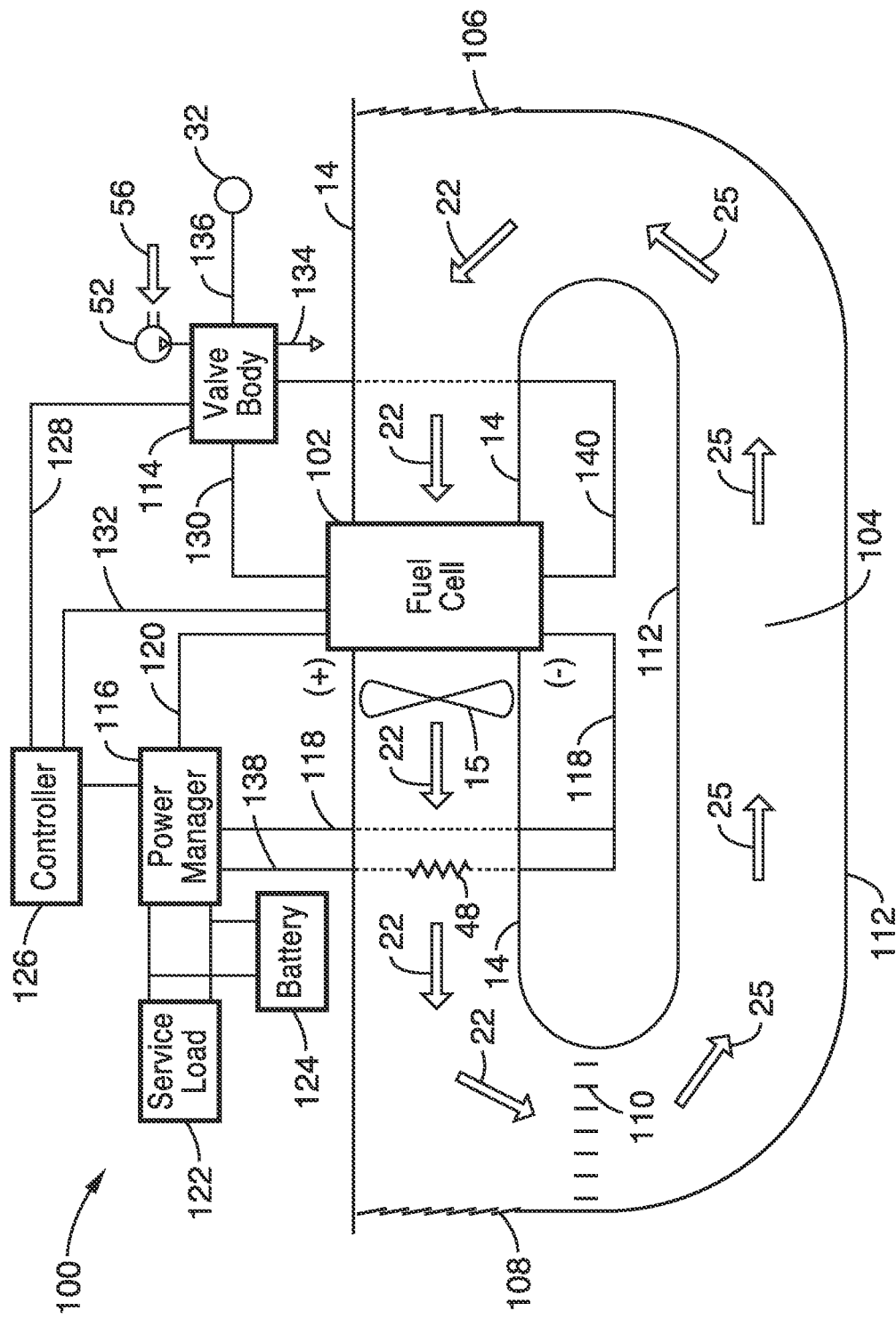
Figure 3C:
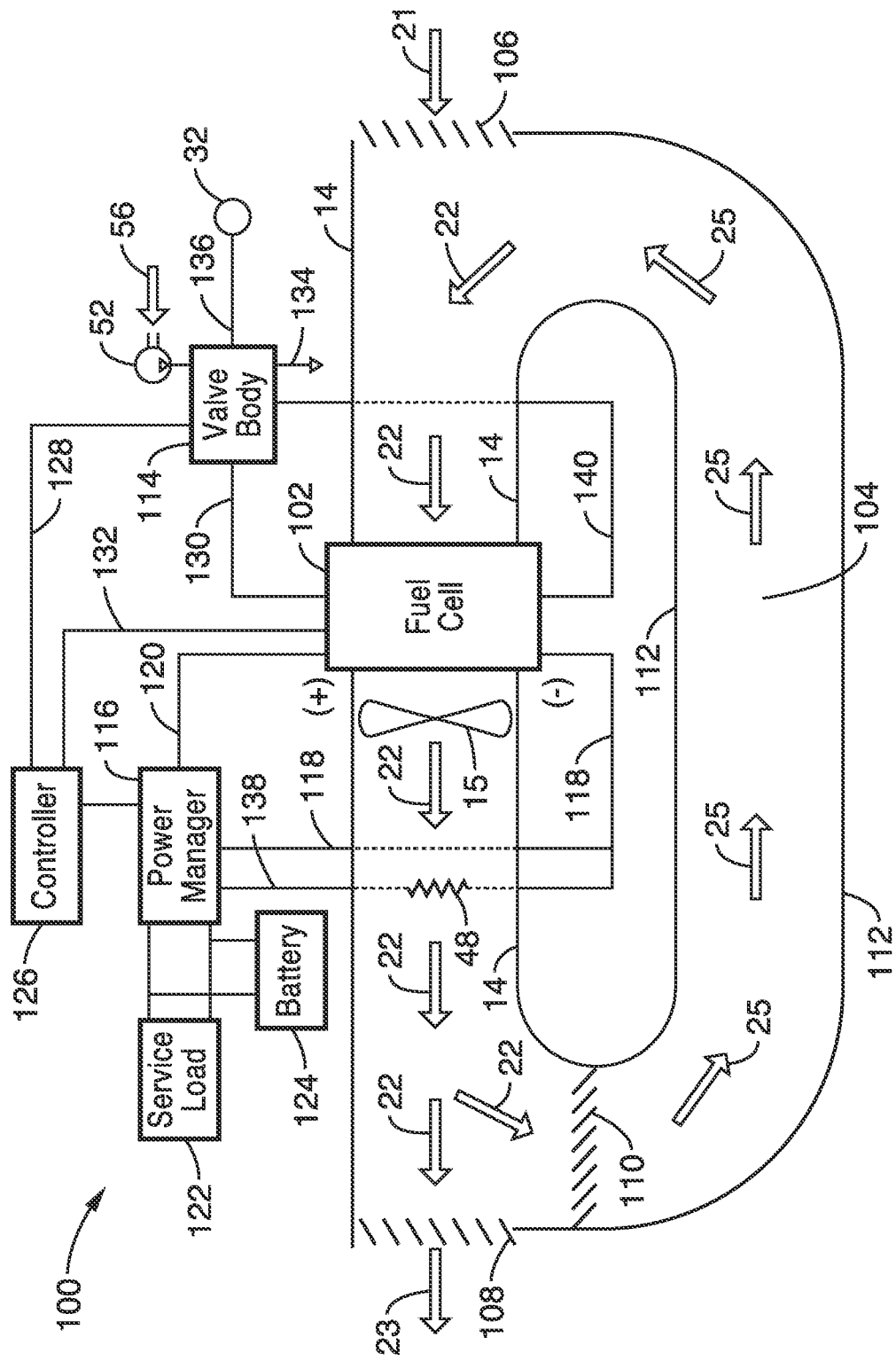

FIGS. 3A, 3B, and 3C are schematic diagrams of a second embodiment of the invention showing three operational variations. FIG. 3A shows a pass through mode, FIG. 3B shows a full recirculation mode, and FIG. 3C shows a partial recirculation mode.

Figure 4A:
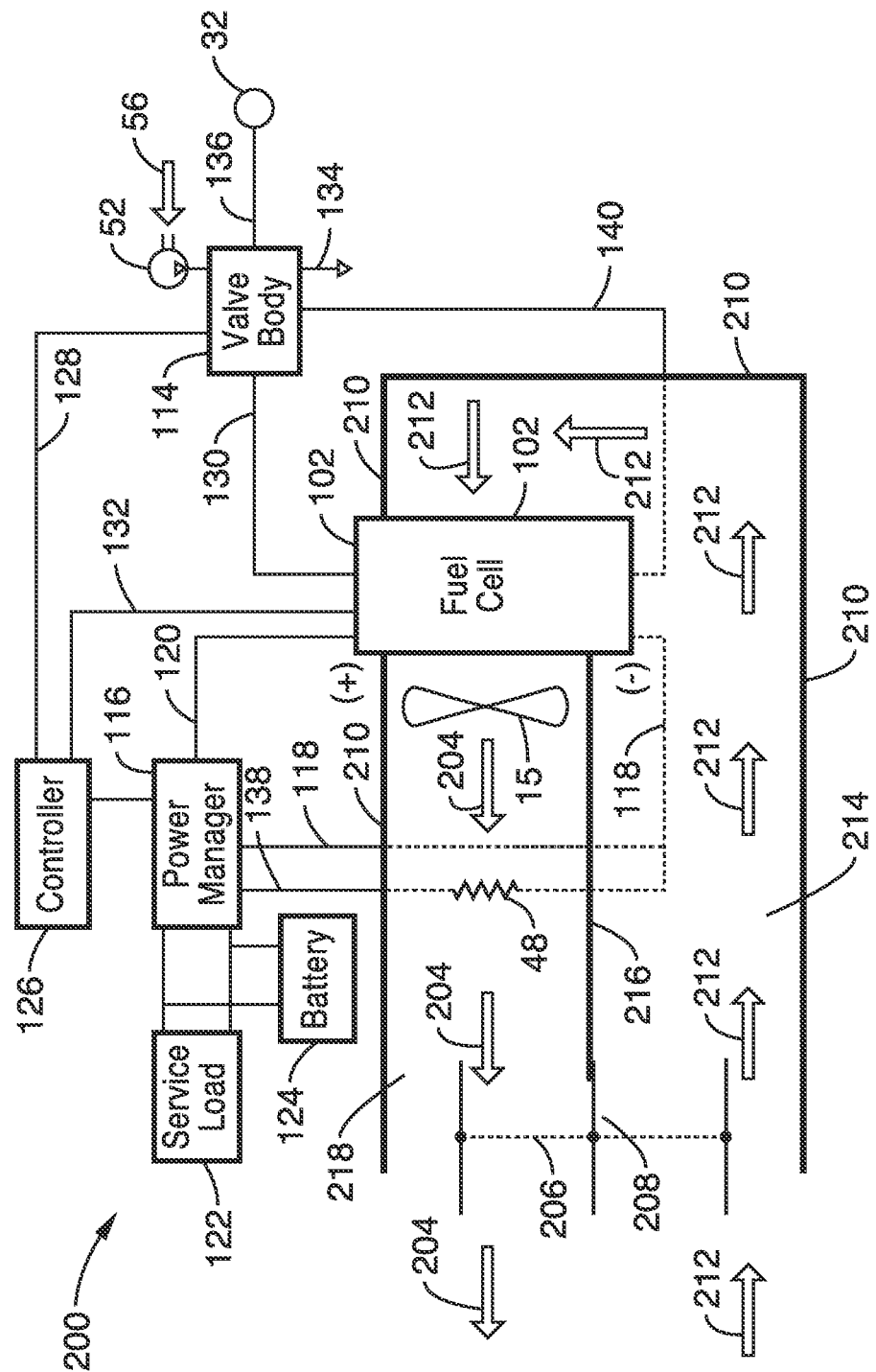
Figure 4B:
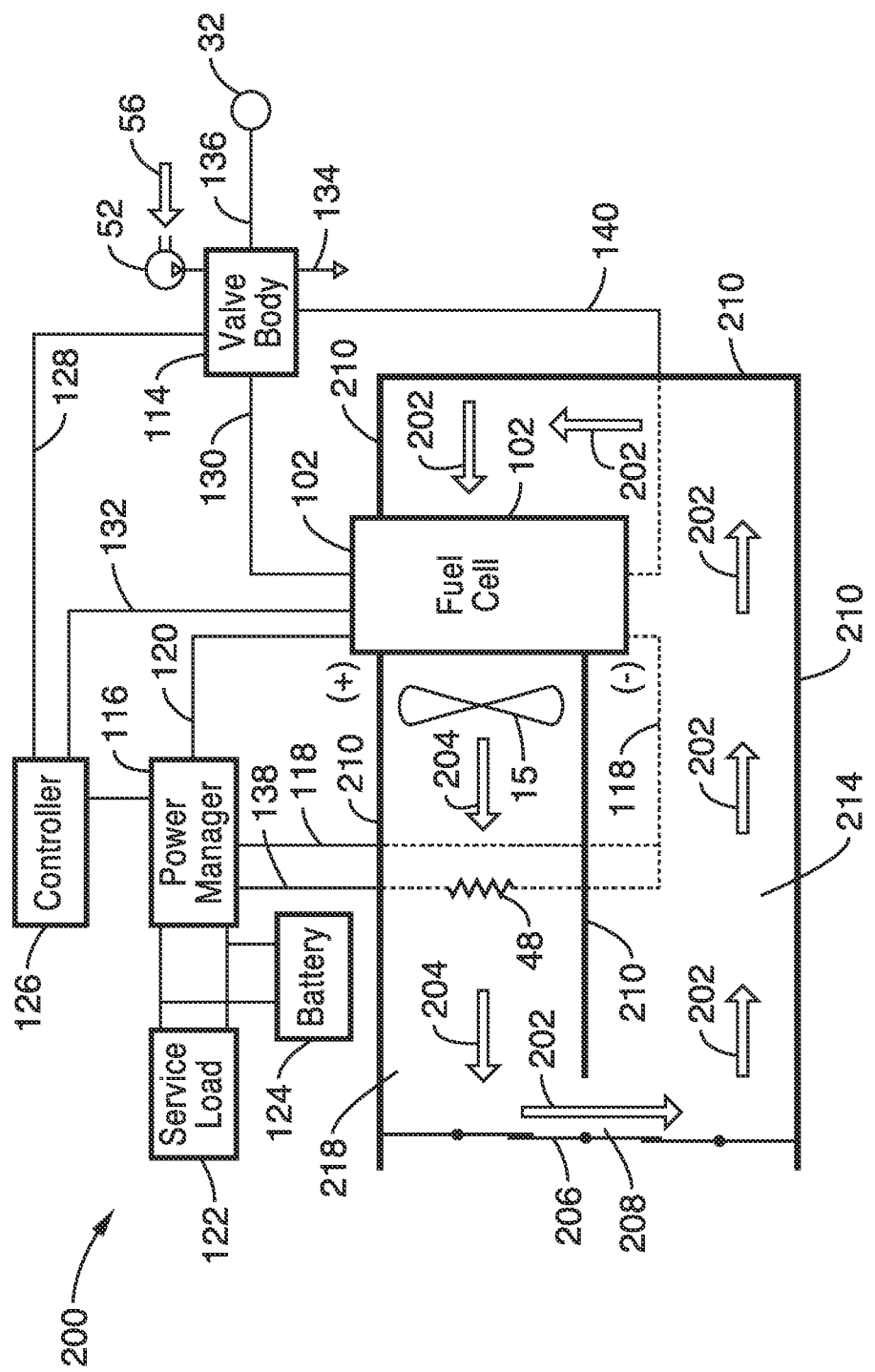
Figure 4C:
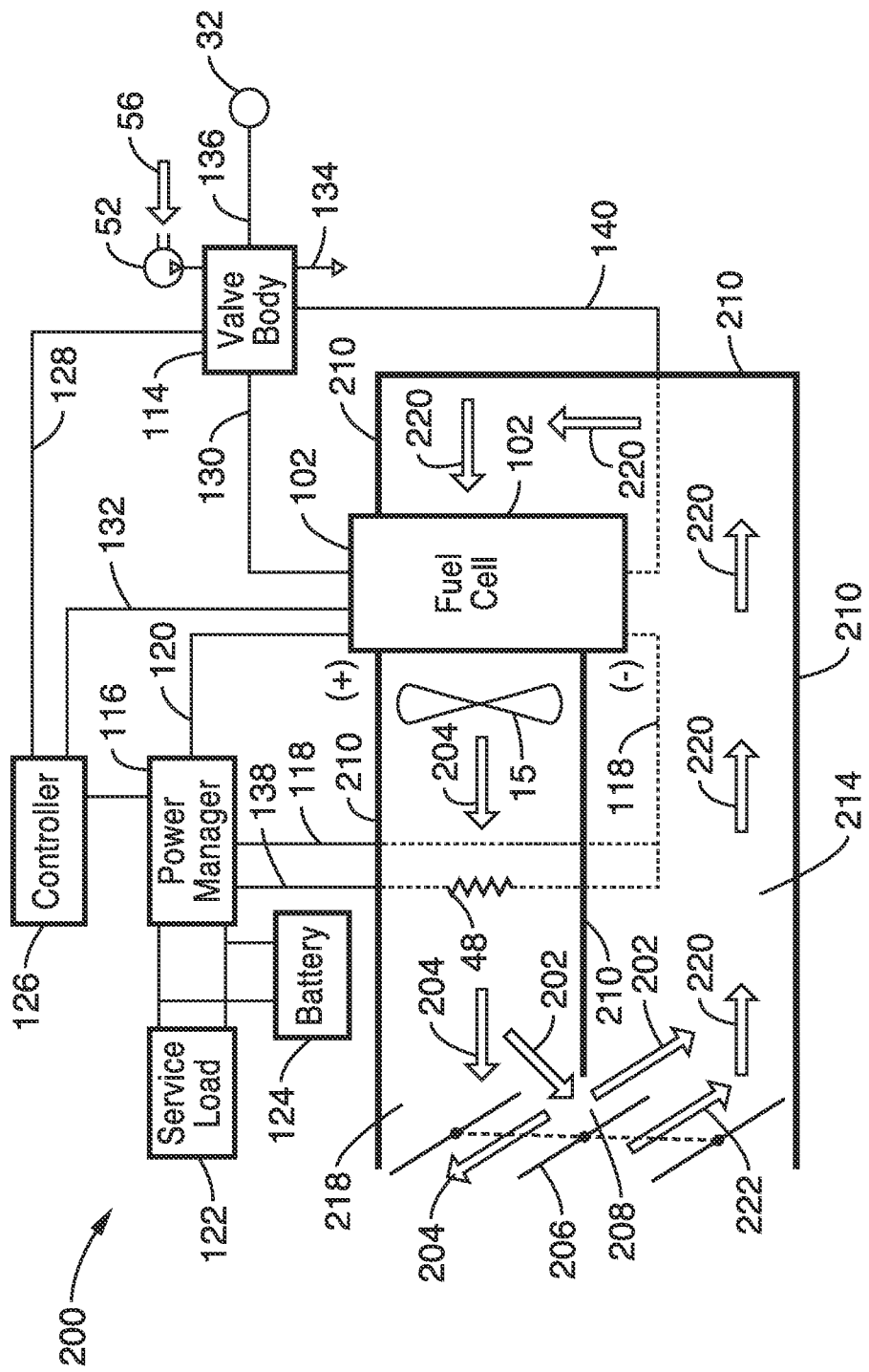

FIGS. 4A, 4B, and 4C are schematic diagrams of a third embodiment of the invention showing three operational variations: FIG. 4A shows a pass through mode, FIG. 4B shows a full recirculation mode, and FIG. 3C shows a partial recirculation mode.

DETAILED DESCRIPTION OF THE INVENTION

The following is a discussion of the embodiments of the invention on the improvements of an open cathode fuel cell system making use of auxiliary accessories, simplifications and improvements in methods of construction to achieve the improvements.

Figure 1A:
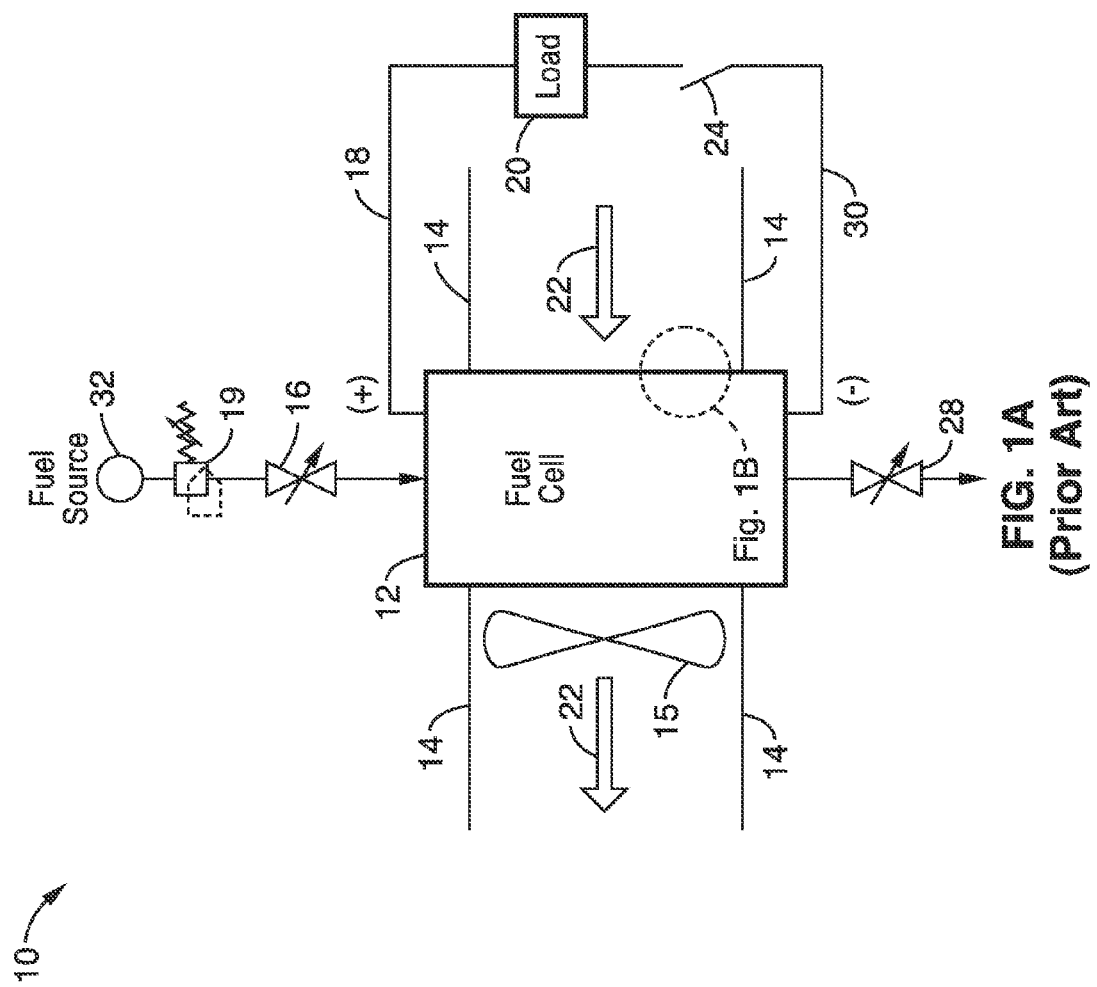
FIG. 1A is a schematic depiction of a prior art open cathode fuel cell system.
Figure 2A:
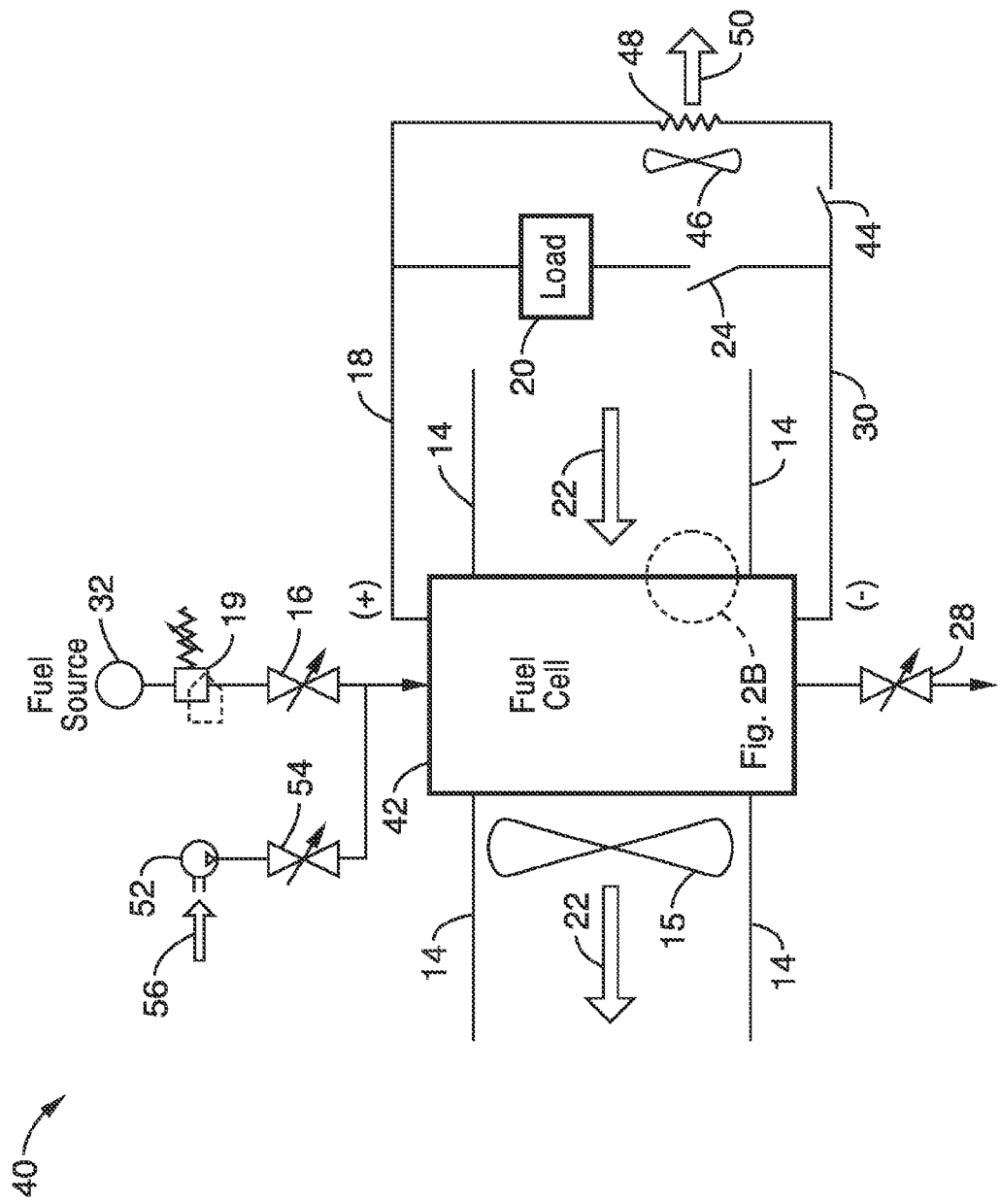
FIG. 2A is a schematic depiction of a first fuel cell system of the present invention.

FIG. 2A shows a PEM fuel cell system 40 configured to provide increased functionality and robustness in accordance with the present invention. To reduce the impact of mixed gas high cathode potentials, it is advantageous to reduce the residence time of the mixed gas condition at the anode. This is accomplished in system 40 by implementation of purge air pump or compressor 52 to quickly move purge air 56 through the fuel cell stack 42 by way of the air purge inlet valve 54 upon stopping of the fuel cell system.

An auxiliary or external electrical load 48 is used to reduce the potentials across the fuel cell stack 42 and consequently across the individual fuel cells 26 during the starting and stopping of the fuel cell system 40. Attendant with the auxiliary electrical load 48 is an external or auxiliary electrical load cooling fan 46 that is configured to force air 50 across or through the auxiliary electrical load 48 for cooling the auxiliary electrical load 48 during its operation. Optionally, the auxiliary electrical load cooling fan 46 may draw air 50 the opposite direction (not shown) through the auxiliary electrical load 48. The auxiliary electrical load 48 and auxiliary electrical load cooling fan 46 are actuated by the closing of switch or relay 44, which causes the auxiliary electrical load 48 to be in electrical parallel with the fuel cell stack 42.

As shown in FIG. 2B, fuel cell stack 42 may optionally include resistor elements 58 and or diodes 60 coupled to the individual fuel cells 26. The resistor elements 58 aid in equilibrating the potentials across the individual fuel cells 26, while the diodes 60 prevent the individual fuel cells 26 from reversing polarity.

From the inert state, i.e., ambient temperature and air residing on both the anode and cathode and no fuel within the system, the fuel cell system 40 is started by first engaging the auxiliary electrical load 48 and the auxiliary electrical load cooling fan 46 by the closing of switch or relay 44. The exit purge valve 28 is opened to vent the fuel cell stack 42, followed by the opening of the inlet valve 16 to then allow the fuel to be purged though the fuel cell stack 42. The simultaneous purging of the inerting air 56 from the fuel cell stack 42 and the engagement of the auxiliary electrical load 48 lowers the potentials within the fuel cell stack 42, reducing cathode catalyst corrosion during the period when there is a mixed gas condition within the fuel cell stack 42. The fuel 32 is purged through the fuel cell stack 42 for a sufficient amount of time to assure the complete displacement of the inerting air from the fuel cell stack 42. After this, the exit purge valve 28 is closed, the switch or relay 44 is opened, the stack fan 15 is engaged, and the main electrical load 20 is applied by the closing of relay or switch 24.

During the purging of the inerting air from the stack 42, the resistor elements 58 of FIG. 2B, if used, aid in providing more consistent potentials among the individual cells 26 within the fuel cell stack 42. Furthermore, the diodes 60, if used, prevent the occurrence of reverse potentials among the individual cells 26 within the fuel cell stack 42.

In a preferred embodiment, the fuel cell stack 42 (as well as fuel cell stack 102 shown in FIGS. 3A-C and 4A-C described below) and individual fuel cells 26 preferably comprise open-cathode proton exchange membrane (PEM) commonly available in the art.

During normal operation, fuel (e.g. hydrogen or reformate) delivered from a fuel source 32 is regulated to the proper operational pressure by pressure regulator 19 and is passed into the fuel cell stack 42 by way of fuel inlet valve 16. Fuel is removed from the stack through the exit or purge valve 28 using the periodic purge method or pass through method. Concurrently, air 22 is supplied to the open cathode by means of a stack fan 15 by drawing air through the fuel cell stack as shown in FIG. 2A, or optionally by blowing air 22 through the fuel cell stack, (e.g. air flow in opposite direction not shown). The stack fan 15 also serves to cool the fuel cell stack 42 during operation. The electrical power generated by the reactions within the fuel cell stack are delivered to the electrical load 20 through electrical leads (cathode lead 18 and anode lead 30), and preferably through switch or relay 24.

The fuel cell system 40 ceases operation by disconnection of the electrical load 20 via opening the switch or relay 24, opening the purge valve 28 to purge the anode volume of water and other matter and providing a volume of fresh fuel 32 into the anode volume, continuing to run the stack fan 15 to cool the fuel cell stack 42, shutting off the stack fan 15 after the fuel cell stack has cooled satisfactorily, and engaging the auxiliary electrical load 48 and the auxiliary electrical load cooling fan 46 by the closing of switch or relay 44.

The fuel inlet valve 16 is then closed, and the air purge inlet valve 54 is opened to force purge air 56 through the fuel cell stack 42 by means of the air purge pump 52 through the air purge inlet valve 54. Purge air 56 is forced through the fuel cell stack 42 for a sufficient period of time to allow the fuel remaining within the anode volume to be purged.

By forcing the purge air 56 through the anode volume, the residence time of mixed gases is reduced and damage to cathode catalyst is reduced, as well as performance losses resulting from the degraded cathode catalyst.

In addition, the simultaneous purging of the fuel from the fuel cell stack 42 and the engagement of the auxiliary electrical load 48 lowers the potentials within the fuel cell stack 42, reducing cathode catalyst corrosion during the periods when there is a mixed gas condition within the fuel cell stack 42. During the purging of the fuel from the stack 42, the resistor elements 58, if used, aid in providing more consistent potentials among the individual cells 26 within the fuel cell stack 42 while the diodes 60, if used, prevent the occurrence of reverse potentials among the individual cells 26 within the fuel cell stack 42.

FIGS. 3A, 3B and 3C show a fuel cell system 100 with consolidated features configured to improve the operation and extend the operational range of the fuel cell. System 100 includes a fuel cell stack 102 and cell stack fan 15, with augmented ducting 14 to allow for a recirculation return passage 104 by means of recirculation return ducting 112. The return ducting 112 may be a structural part the fuel cell system 100 or it may be realized by the placement of the fuel cell system 100 with in a cabinet or other enclosure (not shown), whereby the various walls, panels, divider or other structures of the cabinet or enclosure function as ducting for the fuel cell engine 100. The auxiliary electrical load 48 is placed within the ducting in such a location that the stack fan 15 provides cooling air 22 to auxiliary electrical load 48 as well as cooling air and process air to the fuel cell stack 102.

In a preferred embodiment of system 100, the stack fan 15 draws air 22 through the fuel cell stack 102 and then blows the same air over or through the auxiliary electrical load 48 to providing cooling. In an alternative embodiment (not shown), the stack fan 15 may blow air 22 through the fuel cell stack 102 and draw air 22 over or through the auxiliary electrical load 48 (e.g. reverse to the flow of the air in FIG. 3A).

In further alternative embodiments (not shown), the placement of the fuel cell stack 102, stack fan 15 and the auxiliary electrical load 48 may be configured in different arrangements in which the air 22 is drawn or blown through the fuel cell stack 102 and the same air 22 is drawn or blown over or through the auxiliary electrical load 48 by means of different locations within the ducting 14, 112. For example, the stack fan 15 may be positioned downstream from the auxiliary electrical load 48 or upstream from the fuel cell 102.

System 100 may also comprise with a single integrated valve body 114 that incorporates the valve function of all or many of the individual valves of system 40. That is, rather than have separate valves and valve bodies such as the fuel inlet valve 16, the purge valve 28, the pressure regulation valve 19 and the purge air inlet valve 54 as separate components, the valve body 114 stands as a single component serving the various functions. While a single component valve body 114 may incorporate the assorted valve functions, all valve functions may not be built-in to the valve body 114. As an example, the purge valve 28 and or the pressure regulator 19 may remain as separate component for practical design reasons and not be incorporated into the valve body. Furthermore, any valve configurations shown in FIGS. 2A, 3A through 3C and 4A through 4C may be used interchangeably.

Power is delivered from the fuel cell stack 102 though the stack power lead 120 to the fuel cell system power manger 116, and returned to the fuel cell stack 102 through the stack return power lead 118. Because the stack potential can vary significantly as the power drawn from the fuel cell stack 102 varies, and may not be suitable for the main service load 122, the power coming from the fuel cell stack 102 is preferably conditioned or managed in the power manager 116 to provide a constant potential to the main service load 122.

A computer based fuel cell system controller 126 is provided to monitor the condition of the fuel cell stack, operate the valves of the valve body 114, as well as any other separate valves, and monitor and control the power manger 116.

System 100 may also include a transient energy storage 124 capability in the form of batteries or supercapacitors. In one embodiment, the fuel cell system 100 may serve as a back-up power generator that only operates when there is a grid power outage. Thus, the transient energy storage 124 can provide electrical power for the period of time required for the fuel cell system 100 to come to its operational state.

Air flow 22 within the ducting is controlled by the use of vaned louvers or dampers 106, 108, 110 which are in turn regulated by the fuel cell system controller 126. The vaned louvers or dampers 106, 108, 110 may be comprised of single vanes (not shown) or multiple vanes as shown in FIGS. 3A through 3C.

In a first operational mode shown in FIG. 3A, the air inlet damper 106 of system 100 is fully open and allows external air 21 to enter the fuel cell system 100 by means of being drawn in by the stack fan 15, the air 22 is then drawn through the fuel cell stack 102, cooling the fuel cell stack 102, and providing process air (oxygen) to the fuel cell stack 102. The air 22 is caused to exit the fuel cell system through the open air exit damper 108 and out to the external environment 23. As needed, the air 22 is caused to pass over or through the external/auxiliary electrical load 48 to facilitate cooling of the auxiliary electrical load 48. During this operational mode, the recirculation air damper 110 is fully closed to ensure that the heated air 22 exiting the fuel cell stack 102 is not drawn back through the stack 102.

The operational mode of FIG. 3A is used to effect maximum cooling of the fuel cell stack 102 during operation at higher environmental temperatures, and to reject to the outside environment 23 as much of the heat generated by the fuel cell stack 102 as possible.

FIG. 3B shows a second operational mode wherein the inlet air damper 106 and the exit air damper 108 are closed while the recirculation air damper 110 is fully open. In this operational mode, the air 22 heated by the fuel cell stack 15 is caused to be recirculate back through the recirculation damper 110 and the recirculation return passage 104 by means of recirculation return ducting 112. The recirculated air 25 is reintroduced into the fuel cell stack 102 in order to heat the fuel cell stack 102 to promote higher performance operation at low environmental temperatures and or to bring the fuel cell stack 102 quickly up to the desired operating temperature.

A third operational mode is shown in FIG. 3C. In this mode, the inlet air damper 106, the outlet air damper 108, and the recirculation damper 110 are partially open allowing a portion of the air 22 to pass out of the fuel cell system 100 (external air flow 23) via the exit air damper 108, while allowing another portion of air 25 to be re-circulated by way the recirculation damper 110 and the recirculation return passage 104 by means of recirculation return ducting 112. The re-circulated air 25 is mixed with the air 21 entering through the inlet air damper 106 and reintroduced into the fuel cell stack 102 in order to heat the fuel cell stack 102 to a predetermined operating temperature.

The operational mode of FIG. 3C is applied when the air 21 passing through the inlet air damper 106 is below the predetermined operating temperature of the fuel cell stack 102 and is to be warmed to maintain the fuel cell stack at the predetermined operating temperature. This operational mode is generally the nominal operating mode.

During the operation of the fuel cells system 100, fuel from a fuel source 32 is delivered through the fuel inlet line 136 to the valve body 114 and regulated to the predetermined operating pressure. In an alternative embodiment, the fuel may be delivered to an external fuel pressure regulator (not shown) and then to the valve body 114. The fuel cell system controller 126 provides a command signal to cause the fuel inlet valve incorporated within the valve body 114 to be in the open state allowing fuel to flow into the fuel cell stack 102 through the stack fuel inlet line 130. Periodically, when the fuel cell system 100 is operating in a periodic purge mode described above, a purge valve within the valve body 114 or an external purge valve (not shown) is commanded to open by the fuel cell system controller 126, allowing fuel to pass through the fuel cell stack 102 and the stack purge line 140 and out the purge port 134.

The fuel cell system controller 126 monitors the fuel cell stack 102 and the fuel cell system 100 through the stack and system monitor leads 132 (which may be coupled to temperature sensors, voltage taps, pressure sensors, etc., not shown). Parameters monitored by the fuel cell system controller 126 may include but are not limited to: fuel cell stack 102 temperature, individual fuel cell 26 potentials, inlet 21/outlet 23 air temperature, re-circulated air 25 temperature, humidity, and or pressure differential across the fuel cell stack 102, etc.

Using the data collected from the fuel cell stack 102 and fuel cell system 100, the fuel cell system controller 126 determines and controls the state of valves within (or external to) the valve body 114, as well as the speed of the stack fan 15, positions of the inlet air damper 106, the exit air damper 108, and the recirculation air damper 110 in order to maintain the predetermined fuel cell stack 102 temperature. The air dampers 106, 108, and 100 preferably include, or are configured to operate with, actuation means (e.g. servo motor or other actuation device available in the art, not shown) to drive the position of the air dampers (e.g. open, closed, or partially closed) according to a set program, and/or via feedback from the monitored parameters).

In addition, the fuel cell system controller 126 controls the output potential of the power manager 116 and monitors the current drawn by the main electrical or service load 122. Fuel cell system controller 126 also prevents overload conditions, and commands the power manager 116 (or alternatively an external switch or relay (not shown)) to cause the fuel cell stack power to be delivered to the auxiliary electrical load 48 through the auxiliary electrical load leads 138 and manages the charging of the transition energy storage device 124.

FIGS. 4A, 4B and 4C illustrate an alternative system 200 comprising a single damper 206 which may be single or multi-vaned, and accompanying ducting 210. System 100 comprises a single folded duct 210 instead of the inlet damper 106, the outlet damper 108 and the recirculation damper 110 of system 100 (FIGS. 3A, 3B, and 3C). The ducting 210 of system 200 has combination incoming/recirculating air section 214 and a return/outlet air section 208 separated by a duct divider 216. The ducting 210 and 216 may be a structural part the fuel cell system 200, or it may be realized by the placement of the fuel cell system 200 with in a cabinet or other enclosure (not shown) wherein the walls, panels, divider or other structures of the cabinet or enclosure function as ducting for the fuel cell engine 200.

In a preferred variation of system 200, the stack fan 15 draws air through the fuel cell stack 102 and then blows the same air over or through the external/auxiliary electrical load 48 to provide cooling as shown in FIGS. 4A-4C. In another variation, not shown, the stack fan 15 may blow air through the fuel cell stack 102 and draw air over or through the auxiliary electrical load 48 in the reverse flow of the air as shown in the FIGS. 4A-4C. In further variations, also not shown, the placement of the fuel cell stack 102, stack fan 15 and the auxiliary electrical load 48 may be located in different positions within the ducting 210 such that air is drawn or blown through the fuel cell stack 102, or alternatively drawn or blown over or through the auxiliary electrical load 48 by means of different locations within the ducting 210.

FIG. 4A illustrates a first operational mode of system 200, wherein the single air damper 206 is fully open and allows external air 212 to enter the fuel cell system 200 by means of being drawn into the inlet section 214 by the stack fan 15. The air 212 is then drawn through the fuel cell stack 102, thereby cooling the fuel cell stack 102, and providing process air (oxygen) to the fuel cell stack 102. The heated air 204 is caused to exit the fuel cell system through the open air damper 206 by way of the outlet section 218 and into the external environment. As needed, the air 204, 212 is caused to pass over or through the auxiliary electrical load 48 to facilitate cooling of the auxiliary electrical load 48.

The operational mode of FIG. 4A is preferably used to affect maximum cooling of the fuel cell stack 102 during operation at higher environmental temperatures, and to reject to the outside environment as much of the heat generated by the fuel cell stack 102 as possible. It is also appreciated that the air flows 212, 204 may be reversed to cause the air to be blown through the fuel cell stack 102 (e.g. duct 218 becomes the air intake).

FIG. 4B illustrates a second operational mode of system 200, wherein the single air damper 206 is fully closed. In this operational mode, the air 204 heated by the fuel cell stack 15 is caused to be re-circulate back through the recirculation return passage 208 and re-circulating air section 214 and back into the fuel cell stack 102. The re-circulating air 202 is reintroduced into the fuel cell stack 102 in order to heat the fuel cell stack 102 to promote higher performance operation at low temperatures and/or to bring the fuel cell stack 102 quickly up to the desired operating temperature. As needed, the air 204 is caused to pass over or through the auxiliary external electrical load 48 to facilitate cooling of the auxiliary electrical load 48. It is also appreciated that the air flows 202, 204 may also be reversed, causing the air to be blown through the fuel cell stack 102.

FIG. 4C illustrates a third operational mode of system 200, wherein the air damper 206 is partially open allowing a portion of the heated air 204 to pass to pass through and out of the fuel cell system 200 through the air damper 206 while allowing another portion of the air 202 to be re-circulated though the recirculation return passage 208. The re-circulated air 202 is mixed with the air 222 entering through the air damper 206 to form return air mixture 220, and is reintroduced into the fuel cell stack 102 in order to heat the fuel cell stack 102 to a predetermined operating temperature. This operational variation is applied when the air 222 passing through the air damper 206 is cooler than needed to maintain the predetermined operating temperature of the fuel cell stack 102 and is to be warmed to maintain the fuel cell stack at the predetermined operating temperature. The operational mode of FIG. 4C is typically the nominal operating mode. It is also appreciated that the air flows 202, 204, 220, and 222 may be reversed, causing the air to be blown through the fuel cell stack 102.

During the operation of the fuel cells system 200, fuel from a fuel source 32 is delivered through the fuel inlet line 136 to the valve body 114 and regulated to the predetermined operating pressure or delivered to an external fuel pressure regulator (not shown) and then to the valve body 114. The fuel cell system controller 126 provides a command signal to cause the fuel inlet valve incorporated within the valve body 114 to be in the open state allowing fuel to flow into the fuel cell stack through the stack fuel inlet line 130. Periodically, when the fuel cell system 200 is operating in a periodic purge mode described above, a purge valve within the valve body 114 or an external purge valve (not shown) is commanded to open by the fuel cell system controller 126 allowing fuel to pass through the fuel cell stack 102 and the stack purge line 140 and out the purge port 134. The fuel cell system controller 126 monitors the fuel cell stack 102 and the fuel cell system 200 through the stack and system monitor leads 132.

Those skilled in the art will appreciate that larger systems may employ multiple fans, auxiliary loads, and other additional components readily apparent from the description above. It will further be appreciated by those skilled in the art, that, along with using air as an oxidizer, various fuels can be used such as, for example, hydrogen or reformate.

From the foregoing description it will be appreciated that the present invention can be embodied in various forms, which include but are not limited to the following:

1. A fuel cell system, comprising: a fuel cell stack; a fan; the fan configured to provide process air to supply oxidizer to said fuel cell stack; an air duct coupled to said fan and said fuel cell stack; an electrical load coupled to the fuel cell stack, said electrical load configured for receiving electrical power generated from reactions within the fuel cell stack; and an auxiliary electrical load coupled to the fuel cell stack; wherein the auxiliary electrical load is configured to reduce potentials across the fuel cell stack; and wherein said air duct is configured to direct the flow of air to said fuel cell stack to provide cooling air to said fuel cell stack.

2. The fuel cell system of embodiment 1, wherein the auxiliary electrical load is located within said air duct to provide cooling air to said auxiliary electrical load.

3. A fuel cell system as recited in embodiment 1, further comprising: a purge air pump coupled to the fuel cell stack; wherein the a purge air pump is configured to provide purge air to the fuel cell stack upon stopping of the fuel cell system.

4. The fuel cell system of embodiment 2, further comprising: one or more air dampers configured to control the flow of air within said air ducting.

5. The fuel cell system of embodiment 4, further comprising: a recirculation return passage coupled to said fuel cell stack; wherein the recirculation return passage is configured to redirect air heated by the fuel cell stack back into the fuel cell stack, thereby providing heat for operation of the fuel cell stack.

6. The fuel cell system of embodiment 5, further comprising: a controller coupled to the one or more air dampers; wherein the controller is configured to control the opening and closing of the one or more air dampers to allow or limit infusion of ambient air into the air duct.

7. The fuel cell system of embodiment 6, wherein said one or more dampers are configured to provide multiple modes of operation, said modes of operation comprising: a first mode wherein the air only passes through the duct once; a second mode wherein the heated air re-circulates within the duct; and a third mode wherein a portion of the heated air re-circulates within the duct and a portion of the heated air is directed out of the duct.

8. The fuel cell system of embodiment 7, wherein said one or more dampers comprise a single damper that operates over an intake and outtake of the air duct.

9. The fuel cell system of embodiment 7, wherein said one or more dampers comprise: a first damper configured to allow ambient air into the duct; a second damper configured to direct the heated air out of the duct; and a third damper configured to allow recirculation of the heated air; wherein in the first mode, the first and second dampers are open while the third damper is closed; wherein in the second mode, the third damper is open while the first and second dampers are closed; and wherein in the third mode, the first, second and third dampers are at least partially open.

10. The fuel cell system of embodiment 1, further comprising: one or more resistor elements disposed between individual fuel cells of said fuel cell stack; the one or more resistor elements configured to equilibrate potentials across the individual fuel cells.

11. The fuel cell system of embodiment 1, further comprising: one or more diodes disposed between individual fuel cells of said fuel cell stack; the one or more diodes configured to prevent the individual fuel cells from reversing polarity.

12. A method of operating a fuel cell system having a fuel cell stack, comprising the steps of: from an inert state, engaging an auxiliary electrical load coupled to the fuel cell stack; directing fuel though the fuel cell stack; subsequently operating a fan to direct air flow across the fuel cell stack; said air flow providing cooling air and process oxidizer to said fuel cell stack; and applying an electrical service load across the stack to receive electrical power generated from reactions within the fuel cell stack.

13. The method of embodiment 12, wherein the inerting air is purged from the fuel cell stack while simultaneously engaging the auxiliary electrical load to lower potentials within the fuel cell stack.

14. The method of embodiment 12, further comprising directing cooling air across the auxiliary electrical load.

15. The method of embodiment 12, further comprising directing purge air through the fuel cell stack upon stopping of the fuel cell system from an operational state.

16. The method of embodiment 14, further comprising: controlling one or more air dampers coupled to the fuel cell stack to direct the airflow to the fuel cell stack and auxiliary electrical load; and operating said one or more air dampers to redirect air heated by the fuel cell stack back into the fuel cell stack, thereby providing heat for operation of the fuel cell stack.

17. The method of embodiment 16, further comprising controlling the opening and closing of the one or more air dampers to allow or limit infusion of ambient air into the air duct.

18. A PEM fuel cell system, comprising: a fuel cell stack comprising one or more PEM fuel cells; a fan; the fan configured to provide process air to supply oxidizer to said fuel cell stack; an air duct coupled to said fan and said fuel cell stack; an electrical load coupled to the fuel cell stack, said electrical load configured for receiving electrical power generated from reactions within the fuel cell stack; and an auxiliary electrical load coupled to the fuel cell stack and located within the air duct; wherein the auxiliary electrical load is configured to reduce potentials across the fuel cell stack; and wherein said air duct is configured to direct the flow of air to said fuel cell stack and auxiliary electrical load to provide cooling air to said fuel cell stack and auxiliary electrical load.

19. The fuel cell system of embodiment 18, further comprising: a purge air pump coupled to the fuel cell stack; wherein the a purge air pump is configured to provide purge air to the fuel cell stack upon stopping of the fuel cell system.

20. The fuel cell system of embodiment 18, further comprising: one or more air dampers configured to control the flow of air within said air ducting; and a recirculation return passage coupled to said fuel cell stack; wherein the recirculation return passage is configured to redirect air heated by the fuel cell stack back into the fuel cell stack, thereby providing heat for operation of the fuel cell stack.

21. The fuel cell system of embodiment 20, further comprising: a controller coupled to the one or more air dampers; wherein the controller is configured to control the opening and closing of the one or more air dampers to allow or limit infusion of ambient air into the air duct.

22. The fuel cell system of embodiment 20, wherein said one or more dampers are configured to provide multiple modes of operation, said modes of operation comprising: a first mode wherein the heated air only passes through the duct once; a second mode wherein the heated air re-circulates within the duct; and a third mode wherein a portion of the heated air re-circulates within the duct and a portion of the heated air is directed out of the duct.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A method of operating a fuel cell system having an open-cathode fuel cell stack, comprising the steps of:
   directing fuel through the fuel cell stack to purge inerting air from the open-cathode fuel cell stack;

subsequently operating a fan to direct air flow across the open-cathode fuel cell stack;
said air flow providing cooling air and process oxidizer to said open-cathode fuel cell stack; and
applying an electrical service load across the stack to receive electrical power generated from reactions within the open-cathode fuel cell stack.

2. A method as recited in claim 1, further comprising:
from an inert state, engaging an auxiliary electrical load coupled to the fuel cell stack;
wherein the inerting air is purged from the open-cathode fuel cell stack while simultaneously engaging the auxiliary electrical load to lower potentials within the fuel cell stack.

3. A method as recited in claim 2, further comprising directing cooling air across the auxiliary electrical load.

4. A method as recited in claim 1, further comprising directing purge air through the fuel cell stack upon stopping of the fuel cell system.

5. A method as recited in claim 3, further comprising:
controlling one or more air dampers coupled to the fuel cell stack to direct the airflow to the fuel cell stack and auxiliary electrical load; and
operating said one or more air dampers to redirect air heated by the fuel cell stack back into the fuel cell stack, thereby providing heat for operation of the fuel cell stack.

6. A method as recited in claim 5, further comprising controlling the opening and closing of the one or more air dampers to allow or limit infusion of ambient air into the air duct.

7. A method as recited in claim 1, wherein said air flow simultaneously provides cooling air and process oxidizer to said fuel cell stack.

8. A method as recited in claim 1, wherein the fuel cell stack comprises one or more PEM fuel cells.

* * * * *